US008965922B2

(12) United States Patent
Kandogan et al.

(10) Patent No.: US 8,965,922 B2
(45) Date of Patent: Feb. 24, 2015

(54) INTELLIGENT CONTENT ASSISTANCE

(75) Inventors: Eser Kandogan, Mountain View, CA (US); Jie Lu, Hawthorne, NY (US); Michelle Xue Zhou, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 1916 days.

(21) Appl. No.: 11/928,810

(22) Filed: Oct. 30, 2007

(65) Prior Publication Data
US 2009/0112832 A1  Apr. 30, 2009

(51) Int. Cl.
*G06F 17/30* (2006.01)
*G06Q 10/10* (2012.01)
*G06Q 30/02* (2012.01)

(52) U.S. Cl.
CPC ............... *G06Q 10/10* (2013.01); *G06Q 30/02* (2013.01)
USPC ......................................................... 707/779

(58) Field of Classification Search
USPC .................. 707/999, 731, 767, 779; 709/206
See application file for complete search history.

(56) References Cited

U.S. PATENT DOCUMENTS

| 4,989,141 | A | 1/1991 | Lyons et al. |
| 5,471,575 | A | 11/1995 | Giansante |
| 5,937,155 | A | 8/1999 | Kennedy et al. |
| 6,651,219 | B1 | 11/2003 | Elliott |
| 6,968,316 | B1 | 11/2005 | Hamilton |
| 7,225,187 | B2 | 5/2007 | Dumais et al. |
| 2002/0035487 | A1 | 3/2002 | Brummel et al. |
| 2007/0011246 | A1 | 1/2007 | Wu |

OTHER PUBLICATIONS

Dent, L. et al. "A Personal Learning Apprentice" Proceedings of the 10th National Conference on Artificial Intelligence. 1992.
Hermens, L. et al. "A Machine Learning Apprentice for the Completion of Repetitive Forms" Proceedings of the 9th IEEE Conference on Atrificial Intelligence Applications 1993.
Kozierok, R. et al. "A Learning Interface Agent for Scheduling Meetings." Proceedings of the ACM-SIGCHI International Workshop on Intelligent User Interfaces, 1993.
Mitchell, T. et al. "Experience with a Learning Personal Assistant." Communications of the ACM, vol. 37 Issue 7 pp. 81-91, 1994.
Spenceley, S. et al Intelligent Data Entry for Physicians by Machine Learning of an Anticipative Task Model Proceedings of the 4th Australian and New Zealand Intelligent Information Systems Conference 1996.
Warren, J. et al. "Mediface: Anticipative Data Entry Interface for General Practicioners" Proceedings of the 1998 Australasian Conference on Computer Human Interaction 1998.

(Continued)

*Primary Examiner* — Huawen Peng
(74) *Attorney, Agent, or Firm* — Ryan, Mason & Lewis, LL

(57) ABSTRACT

An intelligent content assistance system generates context-sensitive content recommendation during business processes. Information needs of a user in context are dynamically monitored and detected. Content-recommendation templates are retrieved to match the detected information needs, and instantiated using information from user input, context, interaction history, system-learned query and content models, and external sources. Context, interaction history, and system-learned models are dynamically updated for learning and adaptation. The system and methods are applicable to multiple domains and applications.

20 Claims, 7 Drawing Sheets

(56) References Cited

OTHER PUBLICATIONS

Abecker, A. et al. "Context Aware, Proactive Delivery of Task Specific Information: The Know More Project." Information Systems Frontiers, vol. 2 Issue 3 pp. 253-276, 2000.

Abecker, A. et al. "Active Knowledge Delivery in Semi-structured Administrative Processes." Knowledge Management in Electronic Government KMGov—2001.

Grabski, K. et al. "Sentence Completion." Proceedings of the 27th Annual International Conference of Research and Development in Information Retreival. SIGIR 2004.

Bickel, S. et al. "Learning to Complete Sentences." Proceedings of the 16th European Conference on Machine Learning. ECML 2005.

Nandi, A. et al. "Effective Phrase Prediction." Proceedings of the 33rd Very Large Data Bases Conference. VLDB 2007.

Budzik, J. et al. "Watson: Anticipating and Contextualizing Information Needs." Proceedings of the 62nd Annual Meeting of the American Society for Information Science. 1999.

Rhodes, B. et al. "Just-in-time Information Retreival Agents." IBM Systems Journal, vol. 39, Issues 3 and 4, 2004.

Dumais, S. "Implicit Queries (IQ) for Contextualized Search." Proceedings of the 27th Annual International Conference of Research and Development in Information Retrieval. SIGIR 2004.

Zhu, T. et al "Goal-directed Site-independent Recommendations from Passive Observations" Proceedings of the 12th National Conference on Artificial Intelligence AAAI—2005.

Goodman, J. et al. "Implicit Queries for E-mail," Proceedings of the 2nd Conference on E-mail and Anti-Spam. CEAS 2005.

Billus, D. et al. "Improving Proactive Information Systems." Proceedings of the 2005 International Conference on Intelligent User Interfaces. 2005.

Deshpande, A. et al. "A Propos: Pro-active Personalization for Professional Document Writing," Proceedings of the 10th International Conference of the EARLI Special Interest Group on Writing 2006.

Melguizo, M. "A Proactive Recommendation System for Writing: Helping without Disrupting" Proceedings of the 2007 European Conference on Cognitive Ergonomics. 2007.

*FIG. 1*

| TYPE OF CONTENT ASSISTANCE | EXAMPLES OF USER INPUT | EXAMPLES OF SYSTEM RECOMMENDATION |
|---|---|---|
| 1. PHRASE/SENTENCE WITH PARAMETERS | [PATIENT NOTE] WEAN SEDATION TO<br>[EMAIL] PLEASE COMPLETE<br>[REPORT] DEVELOPMENT TIMES | ASSESS MENTAL STATUS<br>YOUR [FORM ADDRESS]<br>HAVE INCREASED OVER LAST [YEAR DECADE] |
| 2. CO-OCCURRED CONTENT | [PATIENT NOTE] PULMONARY TOILET<br>[REPORT] ATTRITION RATE | CHEST PHYSICAL THERAPY<br>END PRODUCT PRICE |
| 3. INPUT PATTERN | [PATIENT NOTE] WEAN<br>[EMAIL] THE PURPOSE OF THE MEETING | [•] AS TOLERATED<br>IS TO DISCUSS [•] FOR [•] |
| 4. CONTENT FROM EXTERNAL SOURCES | [PATIENT NOTE] BP<br>[PATIENT NOTE] ECHO<br>[EMAIL] SALES ASSOCIATES IN US<br>[REPORT] REVENUE INCREASE IS | 175/110, BLOOD PRESSURE OF PAST 12<br>HOURS ECHOCARDIOGRAM<br>a.b@x.com, c.d@x.com, ...<br>$194 MILLION |

FIG. 8

TO: jsmith@acme.com; bjones@xinc.com; ...; frankbob@wxyzcorp.com — ADDRESS LIST 810

Dear Sales Associates,

I am writing to invite you to the upcoming SA07 Meeting in Orlando. The purpose of this meeting is to update you on the 2008 models and discuss sales strategies going forward. See you all there!

Below is the meeting info.
Sales Associate 2007 Meeting, November 10-11, 2007 http://www.abchotel.com/downtownorlandoproperty — LINK TO WEBPAGE 820

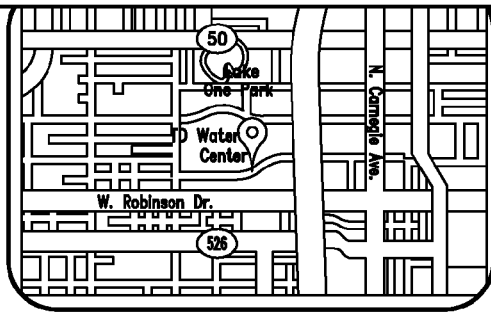

IMAGE 830

Attached are the presentations for the meeting

SA2007 Agenda | SA2007 Overview | SA2007 Plenary | SA2007 Breakouts | SA2007 Townhall Meeting — FILE ATTACHMENT 840

INTELLIGENT CONTENT ASSISTANCE

FIELD OF THE INVENTION

The present invention relates generally to the field of information processing in business processes, and relates, in particular, to intelligent content assistance for business processes.

BACKGROUND OF THE INVENTION

A business process is multi-task in nature, and the information needs of users during the business process constantly vary with tasks and circumstances. The information contents that can satisfy the dynamic information needs often come from multiple sources in multiple formats. The common activities of information processing in business processes, such as accessing, viewing, composing, navigating, and analyzing these diverse information contents, are typically labor-intensive and time-consuming. For example, composing a business email can include multiple tasks with different information needs, such as finding the email addresses of the recipients, determining the subject, filling in the text body, locating relevant references that are referenced in the body of the email, and attaching proper documents. Different information formats and sources are required to satisfy the information needs of different tasks. Further adding to the complexity is that even for the same task, different information contents are often needed under different circumstances. Manually gathering the required information contents and integrating them for each of the many tasks during the business process requires significant human effort.

Some software systems tackle the above problem by providing content assistance to users for specific tasks in specific domains. Examples include active delivery of task-specific knowledge, automatic generation of reports, emails, or records, intelligent meeting scheduling, automatic form filling and phrase/sentence auto-completion. These systems focus on developing techniques that are tailored to pre-determined information needs in well-defined tasks. Thus, no dynamic learning and adaptation take place, and it is difficult to generalize them to address other information needs in different applications.

Other software systems provide content assistance by proactively retrieving and recommending "just-in-time" information in dynamic context. Information retrieval techniques are used to extract terms from context to formulate queries for retrieving documents. These systems usually do not take into account the characteristics of specific tasks and information needs. As a result, content assistance is mostly in the form of documents, which may function well in reminding or serendipitous discovery, but often do not directly address the specific information needs for the task at hand.

Given the above limitations of existing systems, what is needed for information processing in business processes is a system that provides content assistance to satisfy various types of information needs for targeted tasks in dynamic context, and methods that are applicable to content assistance in multiple domains and applications.

SUMMARY OF THE INVENTION

Generally, the present invention provides a framework, system, and methods for intelligent content assistance during business processes. Initially, the system dynamically monitors and detects the information needs of users in context during business processes. Thereafter, the system retrieves proper content-recommendation templates to match the detected information needs. The matched templates are then instantiated with proper values to make appropriate content recommendation. Finally, the system determines the most appropriate way to present the recommended contents.

The present invention provides a wider range of content assistance and is able to detect implicit users' information needs and retrieve relevant information from multiple external sources to provide context-sensitive recommendation, relative to conventional techniques. In addition, the disclosed framework and methods can be applied to multiple domains and applications.

A more complete understanding of the present invention, as well as further features and advantages of the present invention, will be obtained by reference to the following detailed description and drawings.

BRIEF DESCRIPTION OF THE DRAWINGS

FIG. 1 illustrates exemplary types of content assistance processed by the present invention;

FIG. 8 illustrates an example of intelligent content assistance in accordance with the present invention.

DETAILED DESCRIPTION OF PREFERRED EMBODIMENTS

Figure 2:
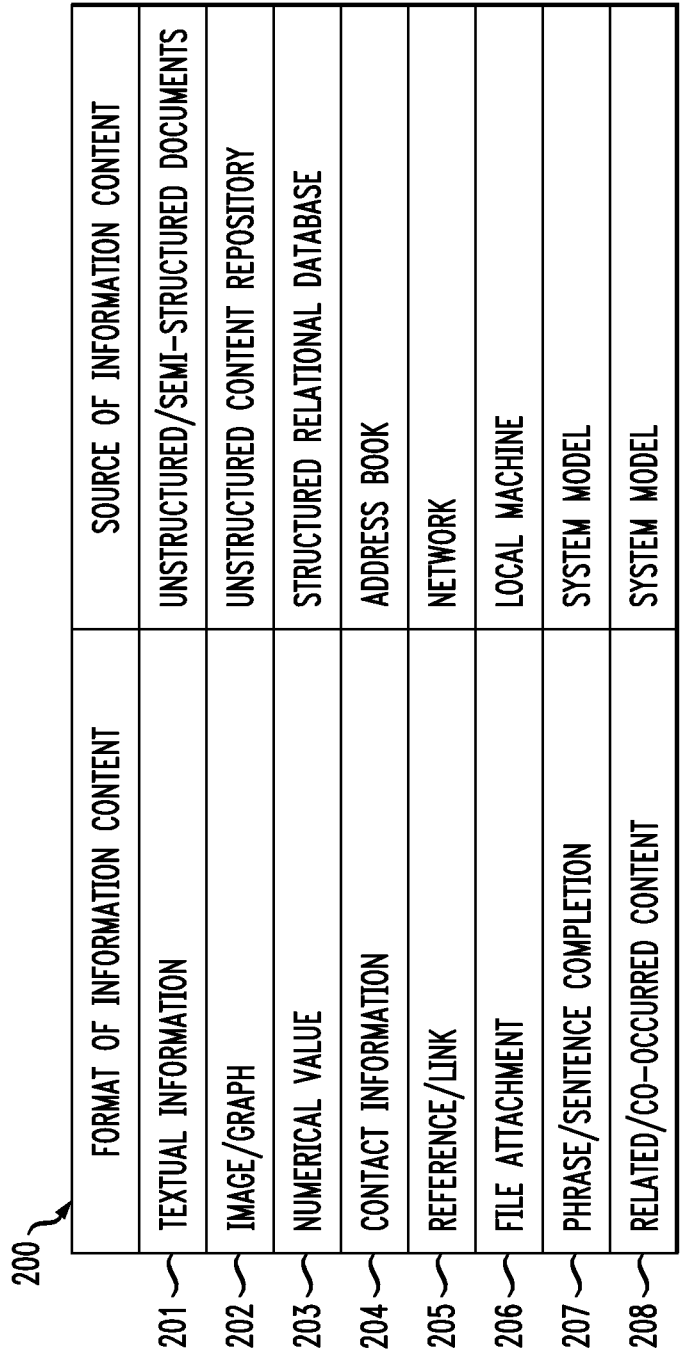
FIG. 2 illustrates exemplary formats of information contents that can be supported by a preferred embodiment of the invention, and the information sources that provide the corresponding contents.

In certain exemplary embodiments, the present invention provides a framework, system, and methods for intelligent content assistance during business processes. The present invention dynamically provides content assistance in context during business processes. The disclosed framework can provide multiple types of content assistance by retrieving and instantiating proper content-recommendation templates based on current information needs (specified by the user or detected by the system), context, interaction history, system-learned models, and information from external sources. In particular, certain embodiments of the present invention can include, but are not limited to, one or more of the following:

1) An interaction system that provides multiple types of content assistance in context to satisfy the dynamic information needs of users during business processes.

2) An iterative, adaptive process that generates context-sensitive content recommendation at run-time based on continuously updated user input and context.

3) Methods for dynamically monitoring and detecting the information needs of users based on user input, context, and system-learned query model.

4) Methods for retrieving and ranking content-recommendation templates using a multi-source scoring approach based on user input; detected information needs, context, interaction history, and system-learned content model.

5) Methods for automatically formulating queries based on user input, retrieved templates, context, and system-learned query model, and retrieving relevant information from various sources to generate candidate values for template parameters.

6) Methods for instantiating the parameters of the retrieved content-recommendation templates based on user input, candidate values for template parameters, and system-learned content model.

7) Methods for ranking and filtering the instantiated templates based on context, interaction history, and system-learned content model.

7) Methods for determining the most, appropriate way to present the recommended contents.

8) Methods for learning and adapting the system models and criteria used to generate the recommended contents.

FIG. 1 is a sample table 100 illustrating exemplary types of content assistance 101-104 processed by the invention. As shown in FIG. 1, the disclosed framework provides a number of exemplary types of content assistance. For each type of content assistance, the content assistance table 100 identifies corresponding examples of user input and corresponding system recommendation. When the content assistance is providing a phrase/sentence with parameters 101, the system recommends phrases and sentences to complete the current user input. For example, if the user types "wean sedation to" in a patient note system, the system will suggest "assess mental status" to complete the phrase. In addition, parameters can optionally be used to cover a wide range of recommendation choices. For example, if the user types "development times have" in a report application, the system will suggest "increased over last [year decade]" to complete the phrase, where the user has to select "year" or "decade" from the recommendation list.

When the content assistance is co-occurred content 102, the system recommends content that frequently co-occurs with the current content. In this manner, the users can acquire the desired content quickly. When the content assistance is an input pattern 103, the system recommends content structures that can be used to avoid a long recommendation list and to reduce the number of proper recommendation choices in further assistance. For example, if the user input is "wean" in a patient note system, the system will suggest "[•] as tolerated" where the character string "[•]" indicates that further user input is required.

When the content assistance is content from external sources 104, the system recommends content automatically retrieved from external information sources. In this manner, the system can save the amount of effort required by users to manually gather such information.

Figure 3:
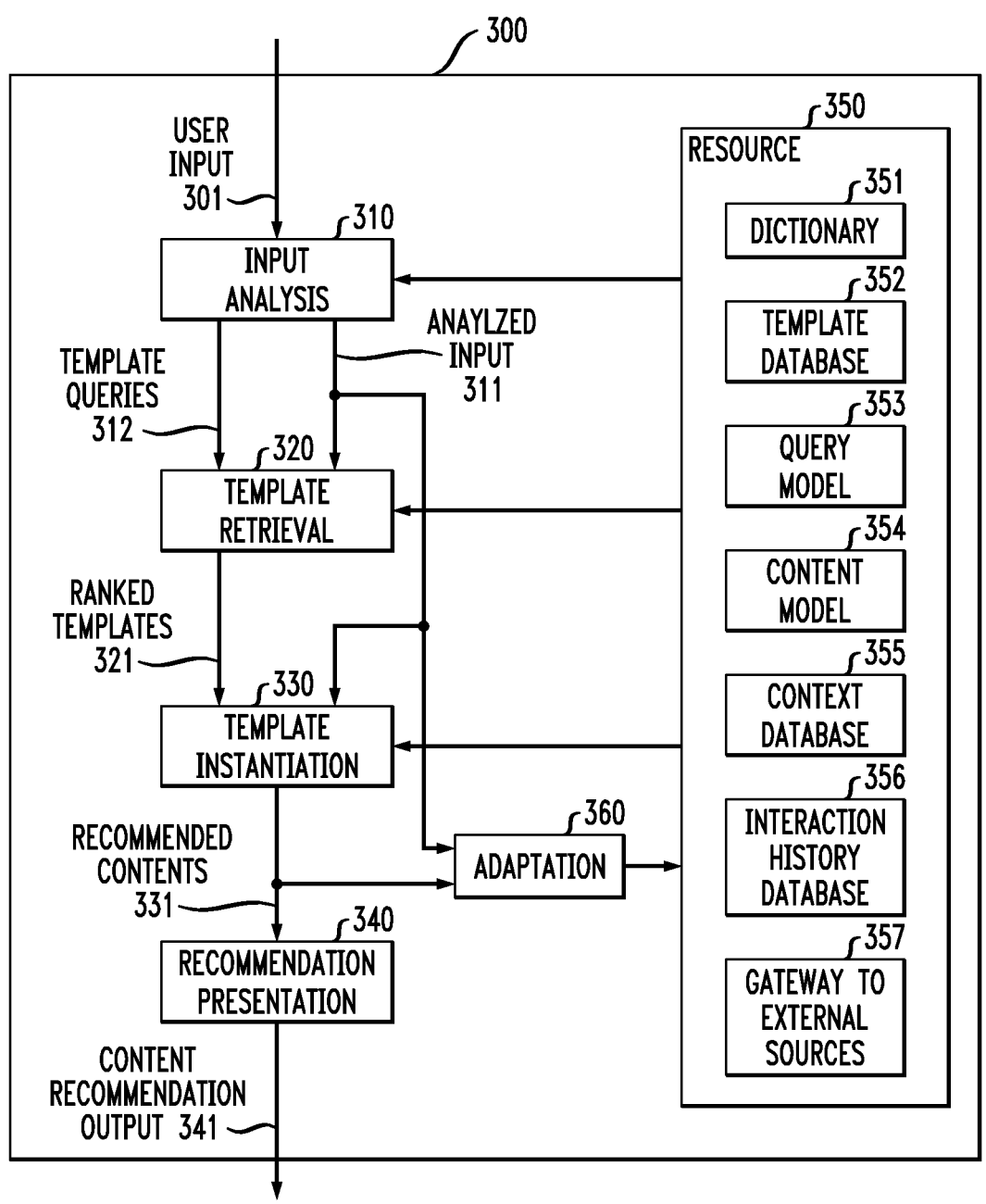
FIG. 3 is a block diagram illustrating an exemplary intelligent content assistance system in accordance with a preferred embodiment of the invention.

FIG. 2 is a sample table 200 illustrating exemplary formats of information contents 201-208 that can be supported by a preferred embodiment of the invention, and the corresponding information sources that provide such contents. For example, when the information content is textual information 201, the information content can be obtained from unstructured and/or semi-structured documents. When the information content is images or graphs 202, the information content can be obtained from an unstructured content repository. When the information content is a numerical value 203, the information content can be obtained from a structured relational database. When the information content is contact; information 204, the information content can be obtained from an address book. When the information content is a reference or link 205, the information content can be obtained from a local or global computer network. When the information content is a tile attachment 206, the information content can be obtained from a local machine. When die information content is a phrase or sentence completion 207 or related or co-occurring content 208, the information content can be obtained from a system model. FIG. 3 is a block diagram illustrating an exemplary intelligent content assistance system 300 in accordance with a preferred embodiment of the invention. As shown in FIG. 3, the intelligent content assistance system 300 accepts user input 301, and produces a content recommendation output 341. The intelligent content assistance system 300 comprises an input analysis module 310, a template retrieval module 320, a template instantiation module 330, a recommendation presentation module 340, a resource module 350, and an adaptation module 360. The resource module 350 comprises a dictionary 351 (which maps elements of input to elements of templates), a template database 352 (which stores content-recommendation templates), a query model 353 (which stores knowledge about information needs and requests), and a content model 354 (which stores knowledge about contents and the associations between contents, templates, and context), a context database 355, an interaction history database 356, and a gateway to external information sources 357. The templates in the template database 352 can be created, for example, using text processing and pattern raining techniques against a training corpus during a training phase.

The input analysts module 310 receives the user input 301, uses the dictionary 351, the context from the context database 355, and the query model 353 to analyze the input 301. As shown in FIG. 3 and discussed further below in conjunction with FIG. 4, the input analysis module 310 produces analyzed input 311 and template queries 312 required for template retrieval. As discussed further below in conjunction with FIG. 5, the template retrieval module 320 retrieves the templates from the template database 352 that fully or partially match the template queries 312, and uses a multi-source scoring technique to rank the retrieved templates based on the analyzed input 311, the degree of match between the template queries 312 and the retrieved templates, the context from the context database 355, the interaction history from the interaction history database 356, and the content model 354 to produce a list of ranked templates 321.

Figure 6:
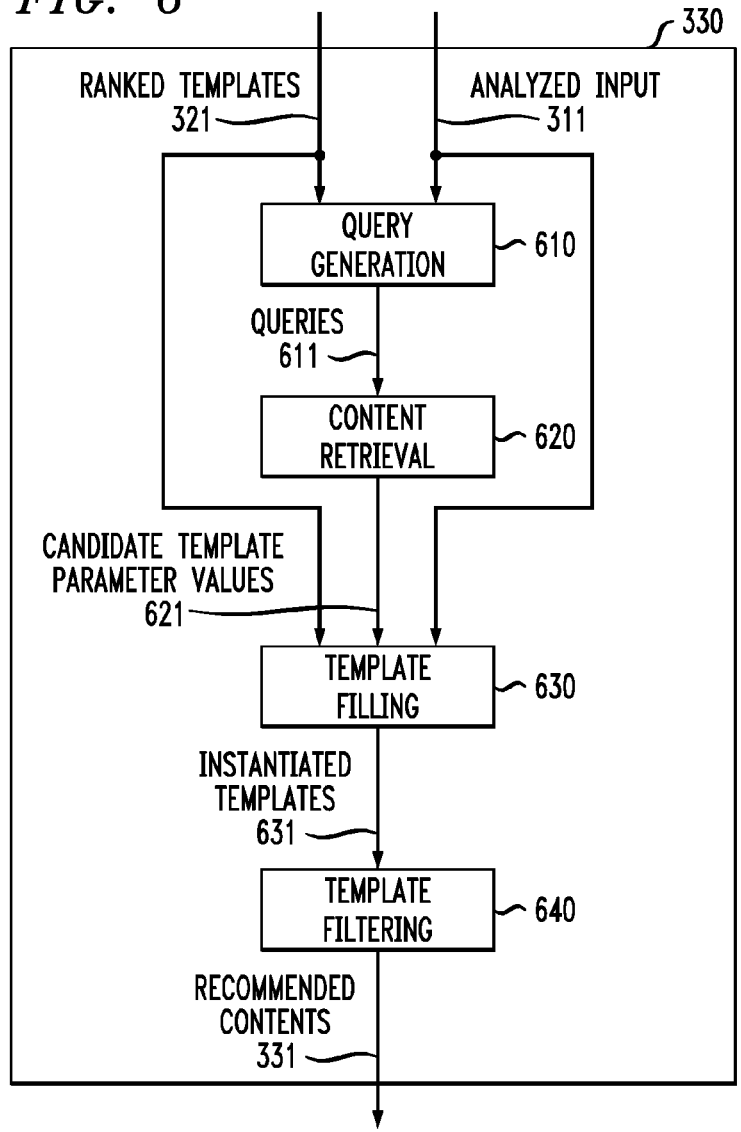
FIG. 6 is an exemplary embodiment of a template instantiation module of FIG. 3, in accordance with a preferred embodiment of the invention.

As discussed further below in conjunction with FIG. 6, the template instantiation module 330 instantiates the parameters of the ranked templates 321 with proper values using the analyzed input 311, and the resources including the dictionary 351, the query model 353, the content model 354, the context database 355, the interaction history database 356, and the gateway to external information sources 357, and produces a list of recommended contents 331. As discussed further below in conjunction with FIG. 7, the recommendation presentation module 340 processes the recommended contents 331 to generate the content recommendation output 341.

Figure 4:
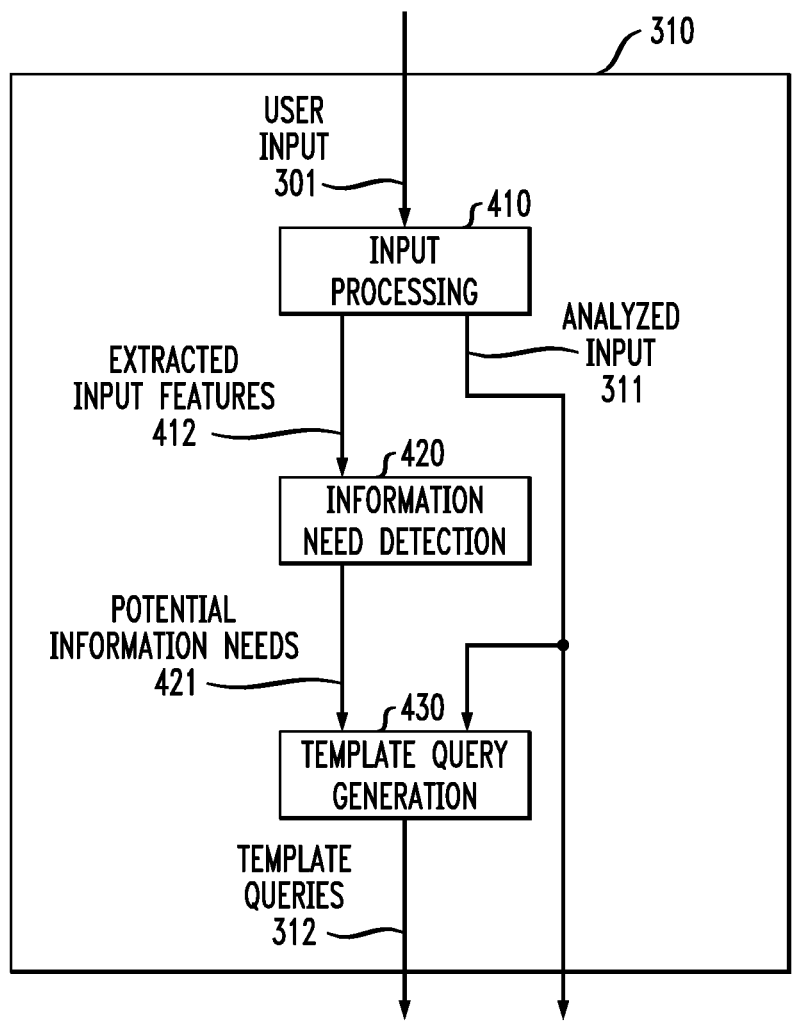
FIG. 4 is an exemplary embodiment of an input analysis module of FIG. 3, in accordance with a preferred embodiment of the invention.

The adaptation module 360 receives the analyzed user input 311 and the recommended contents 331, and updates the dictionary 351, the query model 353, the content model 354, the context database 355, and the interaction history database 356, as appropriate, using known techniques. For example, during the learning and adaptation process 360, the system learns correlations between contents and templates, in order to create and instantiate content-recommendation templates. In addition, correlations between contents are identified in order to identify co-occurred contents 102. Associations are also recognized between contents and information from various sources, as well as new vocabulary and input patterns. Finally the models and databases are updated based on the above new information learned from user input and feedback. As indicated above, the input analysis module 310 of FIG. 3 produces analyzed input 311 and template queries 312 required for template retrieval. FIG. 4 is an exemplary embodiment of the input analysis module 310 of FIG. 3. The exemplary input analysis module 310 detects the information needs of users in context. As shown in FIG. 4, the exemplary input analysis module 310 comprises an input processing module 410, an information need detection module 420, and a template query generation module 430. The input processing module 410 takes user input 301 of FIG. 3 as input, conducts lexical, syntactic, and semantic analysis of the user input 301, and outputs analyzed input 311 of FIG. 3 and extracted input features 412. Based on the extracted input features 412, the context from the context database 355 of FIG. 3, and the query model 353 of FIG. 3, the information need detection module 420 determines potential information needs 421 implied by current user input. The template query generation module 430 generates template queries 312 based on the analyzed input 311 and the potential information needs 421.

Figure 5:
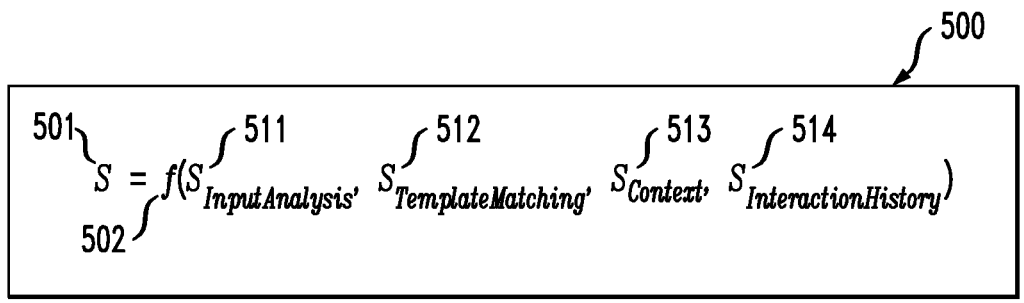
FIG. 5 shows an exemplary method performed by the template retrieval module of FIG. 3 for ranking the content-recommendation templates that match the user input and the detected information needs, in accordance with a preferred embodiment of the invention.

As indicated above, the template retrieval module 320 of FIG. 3 retrieves the templates from the template database 352 that fully or partially match the template queries 312, and uses a multi-source scoring technique to rank the retrieved templates. FIG. 5 shows an exemplary method 500 performed by the template retrieval module of FIG. 3 for ranking the content-recommendation templates. As shown in FIG. 5, in an exemplary embodiment of the present invention, the ranking score of a retrieved template 501 is a function 502 of four scores, namely, the score of input analysis 511, the score of template matching 512, the score based on context 513, and the score based on interaction history 514. The function 502 can be, for example, a weighted linear combination that assigns a weight to each score and sums up the weighted scores. An example of the multiple-source scoring is discussed below in conjunction with FIG. 9.

The score of input analysis 511 is the result of matching the user input 301 of FIG. 3 with entries in the dictionary 351 of FIG. 3, which can be based on the edit distance between input elements and fully or partially matched dictionary entries. The score of template matching 512 is the degree of match between the template queries 312 of FIG. 3 and the content-recommendation template retrieved from the template database 352 of FIG. 3, which can be calculated based on the edit distance or the degree of overlap between the template queries and the template, or using more sophisticated methods that assign different weights to different query and template elements, as would be apparent to a person of ordinary skill in the art. The score based on context 513 is proportional to the probability of the retrieved template given the context from the context database 355 of FIG. 3. Context information includes, for example, knowledge of the current task, metadata of the current document, and contents already processed or created. The probability of a template given the context can be calculated based on the associations between template elements and elements contained in the context. The associations between elements of templates and those of context are stored in the content model 354 of FIG. 3, which can be learned in batch mode from a training corpus and/or incrementally at run-time based on continuously updated user input.

The score based on interaction history 514 is the likelihood of the retrieved template given the interaction history. The system 300 compares the retrieved template with previous content recommendations stored in the interaction history database 356 of FIG. 3. The likelihood of the template given the interaction history is higher if it shares similar features with the recommendations previously accepted by users, and is dissimilar to the recommendations that are ignored.

As indicated above, the template instantiation module 330 of FIG. 3 instantiates the parameters of the ranked templates 321 with proper values, and produces a list of recommended contents 331. FIG. 6 is an exemplary embodiment of the template instantiation module of FIG. 3. As shown in FIG. 6, the exemplary template instantiation module 330 comprises a query generation module 610, a content retrieval module 620, a template filling module 630, and a template filtering module 640.

The query generation module 610 formulates queries 611 that can be recognized by external information sources based analyzed input 311 of FIG. 3, ranked templates 321 of FIG. 3, information from the context database 355 of FIG. 3, and the query model 353 of FIG. 3. The content retrieval module 620 sends the queries 611 to the gateway to external information sources 357 of FIG. 3, collects the retrieval results provided by external information sources, and extracts relevant information pieces to be used as candidate template parameter values 621 for the retrieved templates. The template filling module 630 instantiates the retrieved templates based on the analyzed input 311, the ranked templates 321, the candidate template parameter values 621, and information from the dictionary 351 and the content model 354 of FIG. 3. The template filtering module 640 ranks and filters the instantiated templates 631 based on information from the context database 355, the interaction history database 356, and the content model 354 of FIG. 3 to produce a list of recommended contents 331 of FIG. 3.

Figure 7:
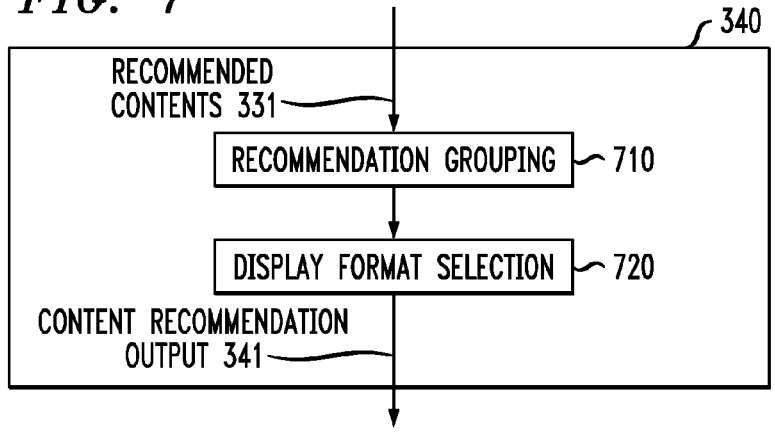
FIG. 7 is an exemplary embodiment of a recommendation presentation module of FIG. 3, in accordance with a preferred embodiment of the invention.

As indicated above, the recommendation presentation module 340 processes the recommended contents 331 to generate the content recommendation output 341. FIG. 7 is an exemplary embodiment of the recommendation presentation module 340 of FIG. 3. As shown in FIG. 7, the exemplary recommendation presentation module 340 comprises a recommendation grouping module 710, and a display format selection module 720. The recommendation grouping module 710 takes recommended contents 331 of FIG. 3 as input, conflates recommendations with similar patterns into lists of options, and removes redundant recommendations. The display format selection module 720 chooses the most appropriate format of display (e.g., list, chart, graph, etc.) for each recommendation to produce content recommendation output 341 of FIG. 3.

FIG. 8 illustrates an example of intelligent content assistance for an exemplary email application incorporating features of the present invention. As shown in FIG. 8, the system 300 can suggest one or more email addresses 810 when the user is populating the "to" field of an email. In addition, based on additional user input, the system 300 can suggest one or more of links to webpages 820, images 830 and file attachments 840, based on current information needs (specified by the user or detected by the system), context, interaction history, system-learned models, and information from external sources.

Figure 9:
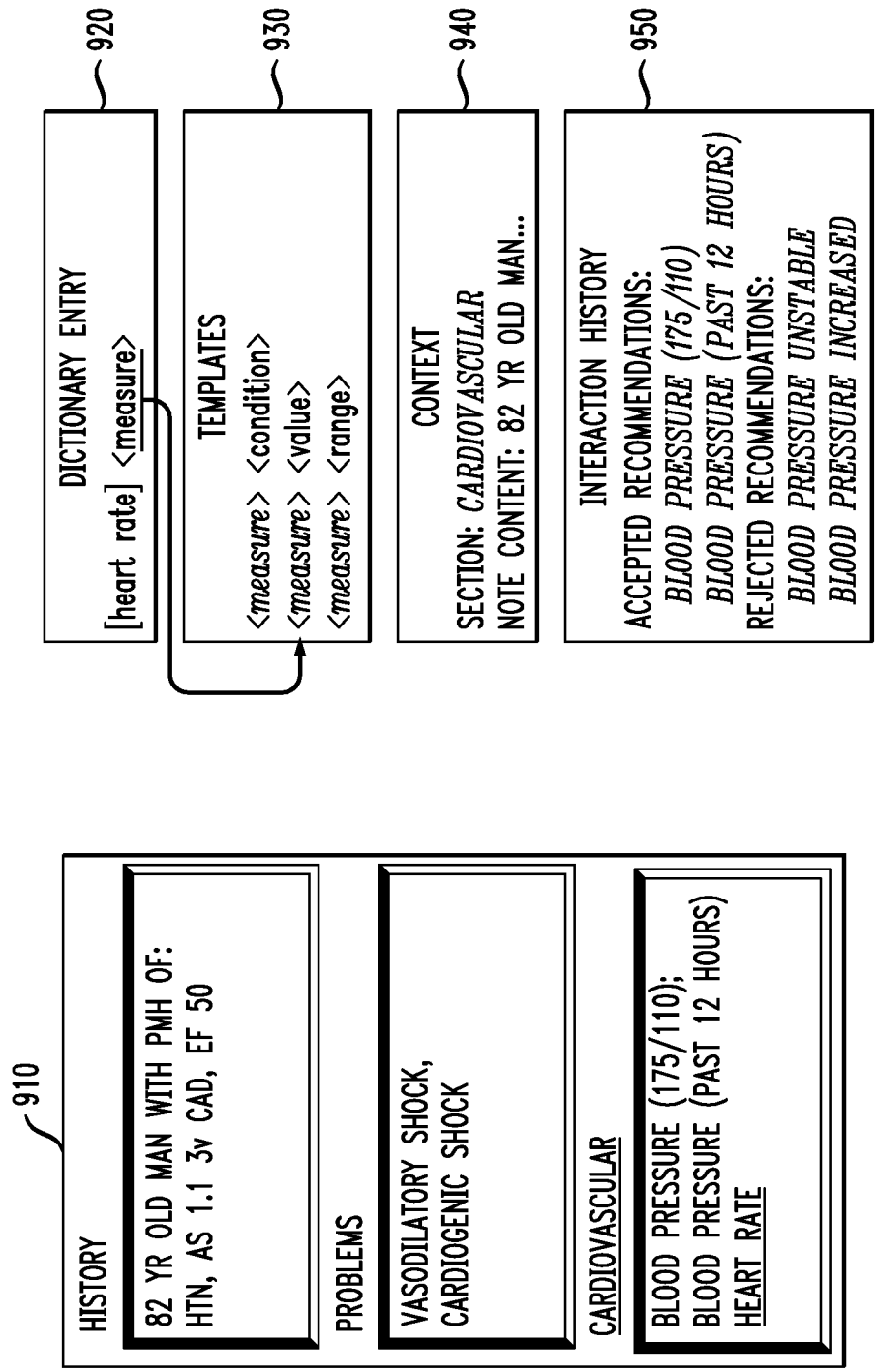
FIG. 9 illustrates an example of the multiple-source scoring of FIG. 5.

FIG. 9 illustrates an example of the multiple-source scoring of FIG. 5. In the example of FIG. 9, a user is entering a patient note 910. Initially, during step 920, the scoring process 500 matches the user input with entries in the dictionary 351, such as an exemplary dictionary entry for a user input "heart rate" in the cardiovascular section. Thereafter, during step 930, the process 500 matches the dictionary entries with templates from the database 352. For example, the selected dictionary entry maps the user input "heart rate" to a number of "measure" templates. During step 940, the process 500 determines the probabilities of each template given the context. The context of interest in this example includes the information that the user input of interest occurred in the cardiovascular section of the note and the content that has already been input in this note prior to the current user input of interest. Finally, during step 950, the process 500 determines the probabilities of each template given the interaction history, whereby sets of recommendations are accepted and rejected. System and Article of Manufacture Details.

As is known in the art, the methods and apparatus discussed herein may be distributed, as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

We claim:

1. A method for generating one or more context-sensitive content recommendations, comprising the steps of:
   detecting information needs of a user;
   retrieving one or more content-recommendation templates that substantially match the detected information needs; and
   instantiating the retrieved templates with one or more parameter values to generate one or more recommended contents, wherein said steps are performed by a processor.

2. The method of claim 1, further comprising the step of presenting the recommended contents to the user.

3. The method of claim 1, wherein the step of detecting information needs further comprises the steps of:
   analyzing user input;
   determining potential information needs; and
   generating template queries required by template retrieval.

4. The method of claim 3, wherein the detection of information needs is based on information from one or more of a dictionary, a query model, and a context database.

5. The method of claim 1, wherein the step of retrieving one or more content-recommendation templates further comprises the steps of:
   retrieving templates from a template database using one or more template queries; and
   ranking the retrieved templates.

6. The method of claim 5, wherein the step of ranking the retrieved templates uses a multi-source scoring method to generate a ranking score S of each template.

7. The method of claim 6, wherein said score S of each template is computed as follows:

$$S = f(S_{InputAnalysis}, S_{TemplateMatching}, S_{Context}, S_{InteractionHistory})$$

where $f$ is a function used to combine scores from four sources, $S_{InputAnalysis}$ is a result of matching the user input with entries in a dictionary, $S_{TemplateMatching}$ is a degree of match between the template queries and the content-recommendation template retrieved from the template database, $S_{Context}$ is proportional to a probability of the retrieved template given a context and a content model, and $S_{InteractionHistory}$ is a likelihood of the retrieved template given an interaction history.

8. The method of claim 1, wherein the step of instantiating the retrieved templates further comprises the steps of:
   formulating queries for retrieving information from external sources;
   sending the queries to one or more external information sources and collecting the retrieval results;
   extracting one or more relevant information pieces to generate candidate template parameter values;
   instantiating the parameters of the retrieved templates; and
   ranking and filtering the instantiated templates.

9. The method of claim 8, wherein the formulation of queries is based on information from a context database and a query model.

10. The method of claim 8, wherein the instantiation of template parameters is based on information from a dictionary and a content model.

11. The method of claim 8, wherein the ranking and filtering of instantiated templates are based on information from a context database, an interaction history database, and a content model.

12. The method of claim 2, wherein the step of presenting recommended contents further comprises the steps of:
   conflating recommendations with similar patterns into lists of options, removing redundant recommendations; and
   selecting an appropriate format of display for recommendations.

13. The method of claim 1, further comprising the step of dynamically updating one or more of a dictionary, a query model, a content model, a context database, and an interaction history database based on continuous user input.

14. An apparatus for generating one or more context-sensitive content recommendations, the apparatus comprising:
- a memory; and
- at least one processor, coupled to the memory, operative to:
  - detect information needs of a user;
  - retrieve one or more content-recommendation templates that substantially match the detected information needs; and
  - instantiate the retrieved templates with one or more parameter values to generate one or more recommended contents.

15. The apparatus of claim 14, wherein said processor is further configured to detect said information needs by
- analyzing user input;
- determining potential information needs; and
- generating template queries required by template retrieval.

16. The apparatus of claim 14, wherein said processor is further configured to retrieve said content-recommendation templates by:
- retrieving templates from a template database using one or more template queries; and
- ranking the retrieved templates.

17. The apparatus of claim 14, wherein said processor is further configured to instantiate said retrieved templates by:
- formulating queries for retrieving information from external sources;
- sending the queries to one or more external information sources and collecting the retrieval results;
- extracting one or more relevant information pieces to generate candidate template parameter values;
- instantiating the parameters of the retrieved templates; and
- ranking and filtering the instantiated templates.

18. An article of manufacture for generating one or more context-sensitive content recommendations, comprising a tangible machine readable storage medium containing one or more programs which when executed implement the steps of:
- detecting information needs of a user;
- retrieving one or more content-recommendation templates that substantially match the detected information needs; and
- instantiating the retrieved templates with one or more parameter values to generate one or more recommended contents.

19. A system for intelligent content assistance, comprising:
- a memory; and
- at least one processor, coupled to the memory, operative to execute:
- an input analysis module, for analyzing user input to detect information needs of a user in context;
- a template retrieval module, for retrieving proper content-recommendation templates to match the detected information needs;
- a template instantiation module, for instantiating the retrieved templates to generate the recommended contents;
- a recommendation presentation module, for presenting the recommended contents;
- a resource module, for managing one or more resources required to generate context-sensitive content recommendations; and
- an adaptation module, for dynamically updating the information stored in the resources.

20. The intelligent content assistance system of claim 19, wherein the resource module further comprises:
- a dictionary, for storing mappings between input elements and template elements;
- a template database, for storing content-recommendation templates;
- a query model, for storing knowledge about information needs and requests;
- a content model, for storing knowledge about contents, and the associations between contents, templates, and context;
- a context database, for storing context information;
- an interaction history database, for storing responses of a plurality of users to previous content recommendations.

* * * * *